United States Patent [19]
Gee et al.

[11] Patent Number: 5,397,924
[45] Date of Patent: Mar. 14, 1995

[54] TRUCK TRACTOR AND TRAILER ELECTRICAL COMMUNICATION SYSTEM

[75] Inventors: Thomas A. Gee, Allen Park; E. James Lane, Highland, both of Mich.

[73] Assignee: Eaton Corporation, Cleveland, Ohio

[21] Appl. No.: 173,722

[22] Filed: Dec. 23, 1993

Related U.S. Application Data

[63] Continuation-in-part of Ser. No. 804,302, Dec. 9, 1991, abandoned.

[51] Int. Cl.⁶ .............................................. B60D 1/62
[52] U.S. Cl. ..................... 307/9.1; 280/422; 340/825.06
[58] Field of Search ................. 307/9.1, 10.1, 10.8, 307/38, 40, 155, 125, 154; 439/35; 280/422, 420; 340/825.63, 825.06, 825.04, 825.03, 439, 458; 315/76; 180/170; 364/424.01, 424.03, 424.04, 424.05

[56] References Cited

U.S. PATENT DOCUMENTS

| | | | |
|---|---|---|---|
| 3,967,862 | 7/1976 | Hunter et al. | 303/103 |
| 4,842,532 | 6/1989 | Krause | 439/35 |
| 4,897,642 | 1/1990 | DiLullo et al. | 340/825.06 |
| 5,142,278 | 8/1992 | Moallemi et al. | 340/825.06 |

*Primary Examiner*—A. D. Pellinen
*Assistant Examiner*—Richard T. Elms
*Attorney, Agent, or Firm*—Loren H. Uthoff, Jr.

[57] ABSTRACT

A truck tractor and trailer electrical communication system having one electronic control unit located in tractor and another electronic control unit located in at least one trailer both respectively controlling the state of a plurality of switching devices to establish the appropriate electrical connection into and out of a standard seven pin tractor/trailer electrical connector where high speed data communication links are used for control and diagnostics.

16 Claims, 4 Drawing Sheets

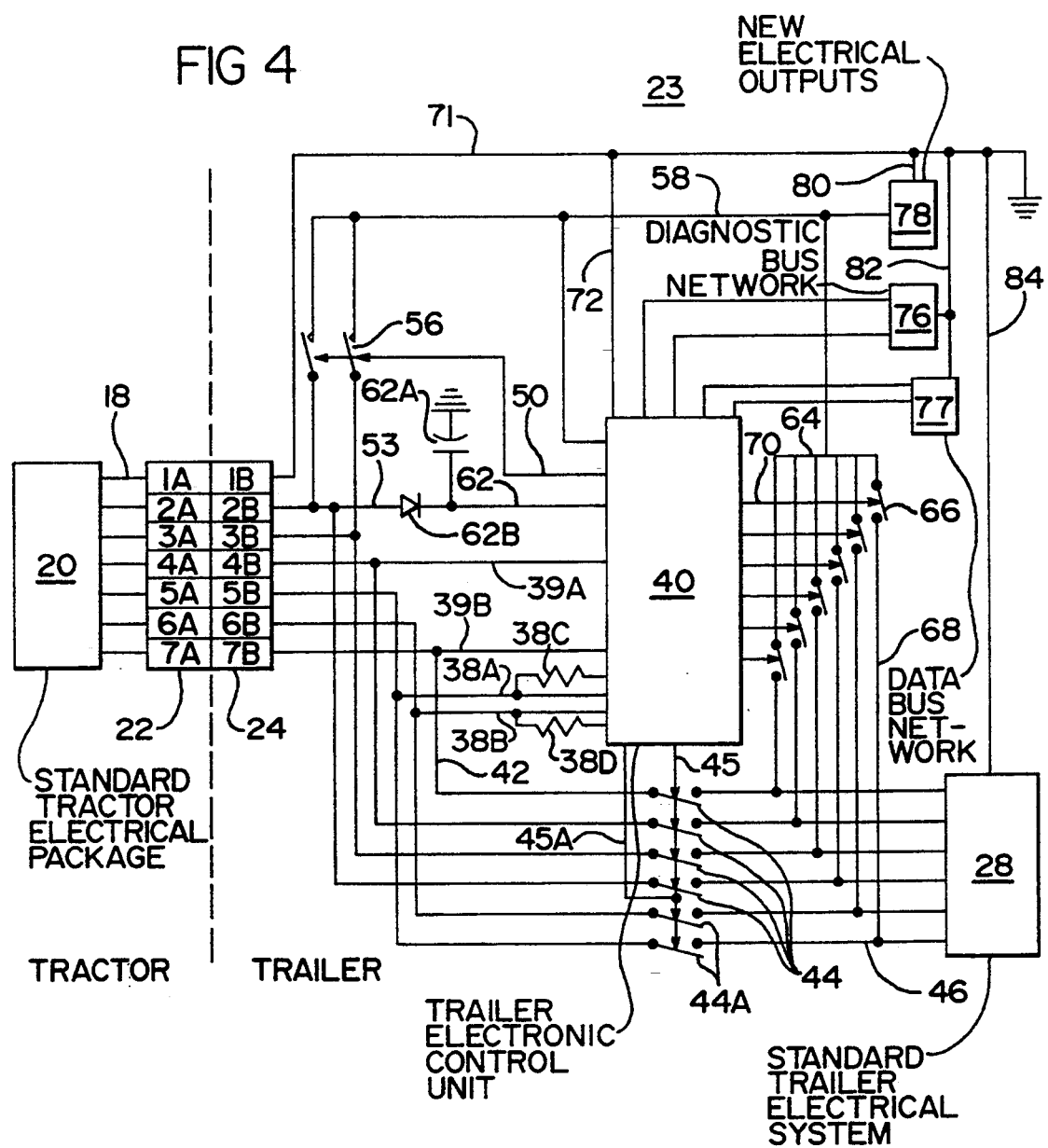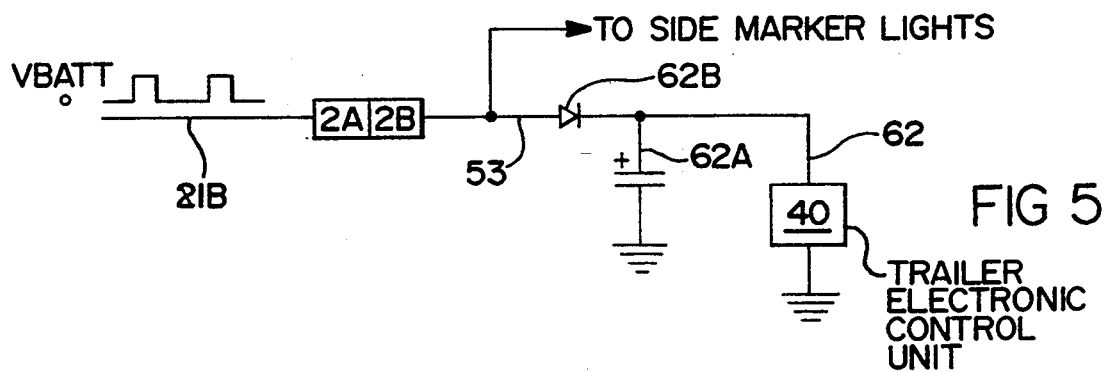

TRUCK TRACTOR AND TRAILER ELECTRICAL COMMUNICATION SYSTEM

This is a continuation-in-part of application U.S. Ser. No. 07/804,302, filed Dec. 9, 1991, now abandoned.

BACKGROUND OF THE INVENTION

This invention relates to a truck tractor and semi-trailer electrical communication system and more specifically to a tractor and semi-trailer electrical wiring system that employs an electronic control unit associated with the tractor to detect the presence or lack thereof of a second electronic control unit associated with the semi-trailer to set the state of a plurality of electrical switches that control the operation of various devices and subsystems.

DESCRIPTION OF THE PRIOR ART

Prior to the invention and commercialization of new electrical systems on heavy and medium duty over the road trucks, the requirements for electrical communication between the truck tractor and trailer or semi-trailer could be accommodated with a seven (7) pin connector which has become standard equipment in the industry. This connector provided for the conduction of power to various truck circuits including turn signals, side markers, stop lamps and a ground reference. As a standardized connection scheme, it allows for intermixed connection between various types of tractors and trailers.

The term "tractor" as used herein refers to any truck vehicle which tows an attached vehicle. It therefore includes trucks and truck tractors. It also includes trailers which are equipped to tow other trailers. The term "trailer" as used herein refers to a towed truck vehicle and includes full truck trailers and truck semi-trailers.

The prior art seven pin connector in its standard configuration does not supply any full time electrical power to the trailer. Recently, advances in truck technology have seen the introduction of advanced truck systems such as anti-lock brakes, diagnostics, electronically enhanced braking, trailer anti-swing control and fault detection. All of these systems would benefit from input power and output signal lines that cannot be handled over the commonly used seven pin connector. Also, the pin and socket dimensions of the standard connector (10 gauge) are not adequate for high amperage connections since a single standard pin and socket is limited in its power handling capacity and multiple pin and sockets must be used to Conduct current levels as required when using the aforementioned advanced systems. In addition, future tractors and trailers will be equipped with a diagnostic data bus and a high speed data bus probably using one of the Society of Automotive Engineers (SAE) specified protocols with each bus structure requiring two (2) electrical wires. The standard seven pin connector has no provision to allow the addition of the diagnostic or the high speed data bus features between tractors and trailers. A larger connector with an increased number of contact pins could be used, but this solution is impractical since all the trailers not retrofitted with the larger connector would be incompatible with retrofitted tractors.

Allied-Signat Inc. has patented a connector with an increased number of connector pins which is known in the art as a "halo" connector and more properly as the "Electropneumatic Jumper Cable Connector" and described in U.S. Pat. No. 4,842,532, the disclosure of which is hereby expressly incorporated herein by reference. The halo connector is essentially a peripheral addition to the commonly used seven pin connector which adds additional electrical or pneumatic connectors for use as needed for advanced systems such as a pneumatic actuated automatic braking system. This type of connector is compatible with a commonly used seven pin connector, but signal to pin allocation for compatibility to a standard tractor or trailer is a problem. Also, pins and sockets are exposed to the environmental elements which can result in corrosion or dirt accumulation when interconnection is made between a tractor and trailer where only one has the "halo" connector resulting in poor reliability.

The use of two electrical connectors is currently used by some European truck and trailer manufactures, but this approach adds expense and complexity and also results in errors in the tractor-trailer interconnections.

BRIEF SUMMARY OF THE INVENTION

The present invention utilizes the seven pin connector found in the current majority of production truck tractors and trailers exclusively. In this manner, compatibility between most all existing tractors and trailers is assured while providing the capability to electrically accommodate almost any advanced system requirements. No special knowledge of the tractor or the trailer equipment is required for proper electrical interconnection by the operator while providing the operation of the conventional trailer electrical system and electrical power, diagnostic and high speed data communication features with the present invention.

To provide the required enhanced communication and power transfer from the truck tractor to the trailer and the required feedback signals from the trailer systems to the tractor such as are often desirable for anti-lock braking or electronically enhanced braking and/or trailer anti-swing, one electronic control unit is located in the tractor and another electronic control unit resides in the trailer. These two electronic control units communicate with one another through the commonly used seven pin connector to configure a plurality of switches to cause the proper action between tractor and trailer and also to receive and process signals. Multiplexing technology, involving serially coded messages as are well known in the art, are used over at least one communication line to provide control, feedback and monitoring information between the tractor and the trailer electronic control units. An example of multiplexing between a tractor and trailer is shown in U.S. Pat. No. 4,897,642 the disclosure of which is hereby expressly incorporated by reference. Also, diagnostic and high speed data can be transferred over the standard connector. The switch configuration can cause the application of full time voltage through at least one pin and socket or more pins and sockets can be used for full time electrical power and in this manner the amperage limit of the overall connector is more fully utilized.

Each of the electronic control units functions as a repeater for the diagnostic or high speed data which is on their respective bus lines (or wires). Certain tractor bus data received by the tractor unit is passed over the tractor to trailer connection and the trailer unit repeats the data onto its trailer bus line. Also, trailer bus data is repeated onto the tractor to trailer connection and the tractor unit then repeats it onto the tractor line. This function allows several benefits. First, it allows the reformatting of the bus data between the two control units. This allows for the special communication information such as the inquiry codes and switch control instructions necessary to operate the two control units to be added to the data stream. Second, the repeater function allows for modifying the identification of certain data which can be used to identify the position of the trailer(s) which sourced the information or which is to receive the information. Thirdly, it allows for removing some messages from the bus which are not necessary for trailers. This allows time for other activities by the processors. If one of the trailers does not have the communication system of the present invention, all subsequent trailers will also act as a standard trailer.

Thus, the commonly used seven pin connector remains in use while the two electronic control units command a plurality of switches to open or close that channel electrical control of conventional trailer functions and the electrical power and communication for advanced systems.

Initially, a configuration inquiry code signal from the tractor electronic control unit is sent at frequent time intervals through the seven pin connector to the trailer. If the trailer does not have an advanced system electronic control unit, then no reply will be received and the tractor electronic control unit software causes the switching hardware to configure the tractor electronics to respond in a traditional fashion through the seven pin connector.

If electronic control units are present on both the tractor and trailer, then the trailer electronic control unit will respond to the configuration inquiry code signal and both electronic control units will activate their software and switching hardware to properly activate the conventional trailer turn signals, sidemarker, stop lamps, etc. and additionally to connect power and communications through the seven pin connector.

One provision of the present invention is to provide for the mixed interconnection in any combination of tractors and trailers that are equipped or non-equipped with advanced systems.

Another provision of the present invention is to provide added functionality to the communication and power lines between a truck tractor and trailer while using a standard electrical connector.

Still another provision of the present invention is to supply full time power through the standard connector within the amperage capacity of the pin and socket connections.

Still another provision of the present invention is to minimally intrude upon the standard trailer functions.

Still another provision of the present invention is to allow for two communication channels, each of the two wire type.

Still another provision of the present invention is to configure a plurality of switching devices to match the tractor and trailer electrical systems.

Still another provision of the present invention is to provide an electronic control unit-based electrical communication system using software to both send and receive inquiries and to interpret feedback signals and to generate appropriate control and diagnostic signals.

Still another provision of the present invention is to act as a repeater in the vehicle's diagnostic and data bus network that regenerates the bus information including location for multiple trailer configurations.

BRIEF DESCRIPTION OF THE DRAWINGS

FIG. 4 is a schematic view of an embodiment of the present invention utilizing one electronic control unit in a trailer joined to a conventional tractor;

FIG. 5 is a schematic view of the present invention showing circuit elements and control strategy that will power the trailer unit.

DESCRIPTION OF THE PREFERRED EMBODIMENT

Figure 1:
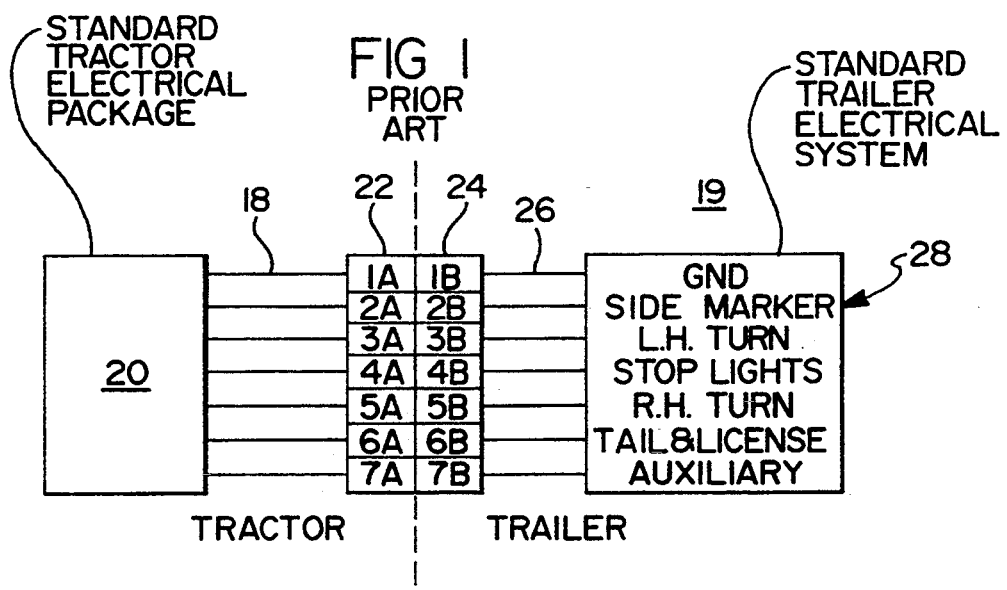
FIG. 1 is a schematic view of the prior art.

Referring to FIG. 1, is an illustration of the prior art electrical connection between a tractor and a trailer where a commonly used seven pin connector package 22 and 24 is used to join a series of electrical socket connectors 1A through 7A respectively to electrical pins 1B through 7B to provide electrical communication between a standard tractor electrical package 20 to a standard trailer electrical package 19 including all of the standard trailer electrical systems 28 such as turn signals, brake lights, side markers and license plate light. The tractor electrical connector 22 joins the tractor normal signal output lines 18 to the trailer electrical connector 24 which is joined to the trailer standard distribution lines 26. The standard connector package 22 and 24 employs 7 pins and sockets and is employed on all North American tractor and trailer combinations intended to be functional when interconnected. The socket and pin (1A-1B) which are designated as the ground wire interconnect are of a larger diameter than the other sockets (2A-7A) and pins (2B-7B). They are fitted with #8 gage wire which has almost double the connection current capacity.

Figure 2:
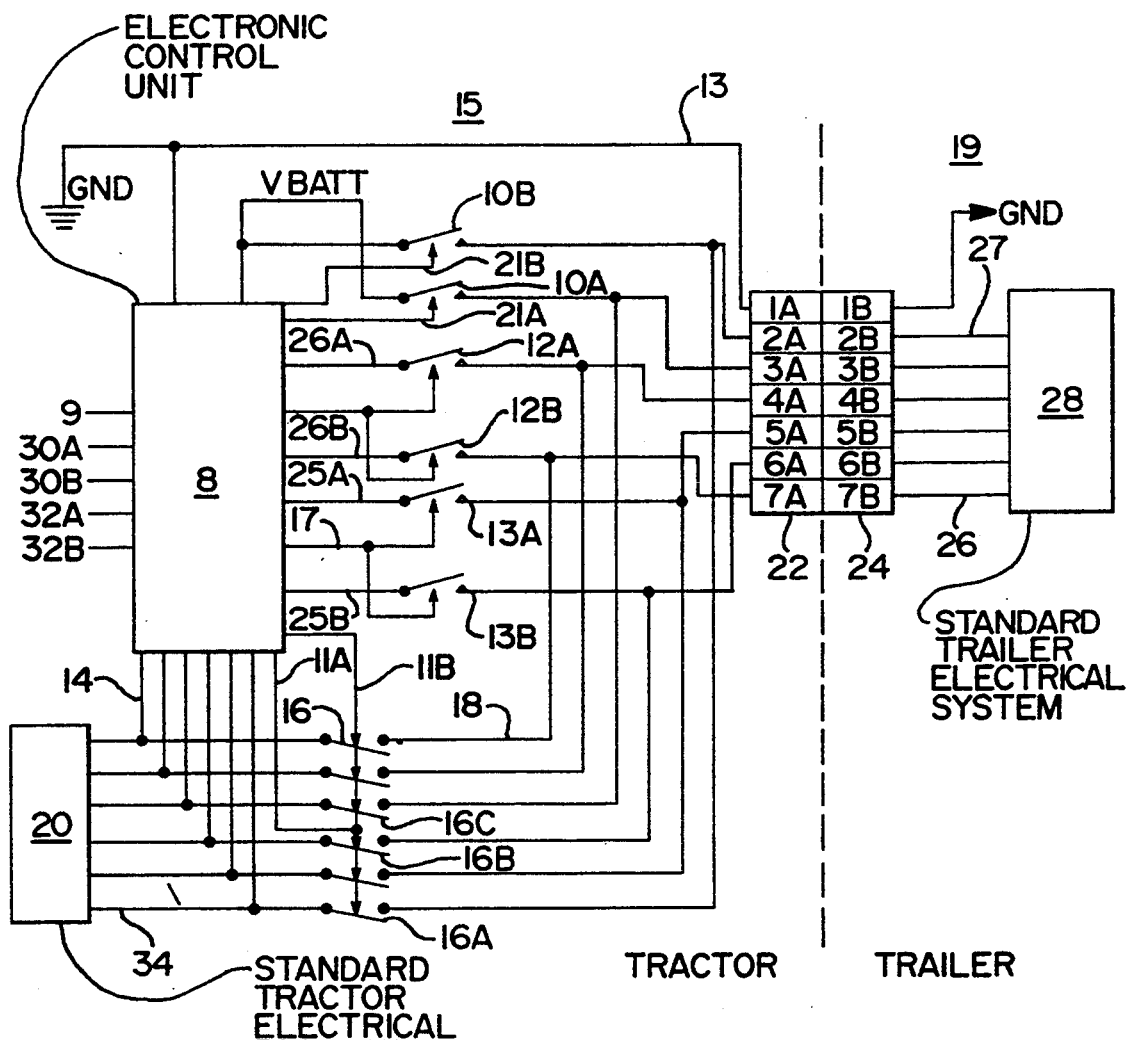
FIG. 2 is a schematic view of an embodiment of the present invention utilizing one electronic control unit in a tractor joined to a conventional trailer.

FIG. 2 illustrates an advanced electrical tractor system 15 of the present invention connected to a standard trailer electrical package 19 by way of the standard connector package 22 and 24. The advanced tractor electrical system 15 employs a tractor electronic control unit 8 which generates and receives electronic signals and controls several sets of electrical switching devices 10A, 10B, 12A, 12B, 13A, 13B and 16 whose states are set by the electronic control unit 8 according to the presence or absence of a compatible system contained on the trailer. Specifically, upon insertion of the tractor electrical connector 22 into the trailer electrical connector 24 or very soon thereafter, the tractor electronic control unit 8 causes the tractor signal switch control line 21B to operate the power switch 10B and tractor signal switch control line 17 to operate signal switches 13A and 13B and causes the tractor normal signal control line 11A to open the tractor normal signal switches 16A, 16B, and 16C. The electronic control unit 8 then outputs an inquiry code signal onto a pair of tractor electronic control unit output signal lines 25A and 25B through the tractor connector sockets 5A and 6A into trailer connector pins 5B and 6B which is routed into the standard trailer electrical systems 28. When the trailer electrical package 19 is of a conventional configuration, and consists of a standard trailer electrical system 28, then no corresponding code is generated by the trailer electrical package 19 and the tractor electronic control unit 8 configures the tractor electrical system 15 to operate in a standard configuration by opening the series of signal switches 13A and 13B and the power switch 10B. Concurrently, the tractor normal signal switches 16A, 16B and 16C are closed thereby connecting the standard trailer electrical package 20 through the tractor normal signal output lines 34 into tractor output lines 18 and into the standard connectors 22 and 24 and finally into the conventional trailer electrical package 19. The tractor connector sockets 1A-7A are plugged into so as to electrically conduct through the trailer connector pins 1B-7B. Trailer ground line 13 is connected to the trailer through connector socket 1A and pin 1B.

The other standard distribution lines, one of which is identified as element 27, electrically connects the trailer electrical connector 24 and the various subsystems of the conventional trailer electrical package 19. The total system operates in a normal manner without intervention of the capabilities of the advanced tractor electrical system 15.

Electronic control unit diagnostic lines 30A and 30B contain information sufficient to discover problems with the electronic control unit of the tractor or trailer system signals fed into the electronic control unit. The high speed data link lines 32A and 32B can be hooked to another electronic control unit or to other advanced electronic systems either internal or external to the truck to exchange information between the tractor electronic control unit 8 and that other system.

An alternative embodiment eliminates the plurality of tractor normal signal switches 16, 16A, 16B and 16C and tractor output lines 18. The tractor normal signals are routed to the tractor electronic control unit 8 through output lines 34 or through high speed data lines 32A and 32B. The tractor electronic control unit interprets the signals and supplies electrical power to the tractor electrical connector 22 by supplying power individually to the plurality of separate advanced tractor electrical system lines such as 25A, 25B, 26A, 26B. Individual tractor signal control lines 17 are used to control individual switches such as 10A, 10B, 12A, 12B, 13A or 13B on each output signal line.

In the conventional trailer system, line 27 powers the trailer side marker lights. It is relatively unimportant which of the interconnect sockets 2A, 3A, 5A or 6A is selected to be energized through contacts 10B, or 13A and 13B because these connections power light systems and the configuration inquiry signal mode check will be fast enough (approximately 0.015 second) that the lights will not flicker. Thus, the system inquiry mode check is minimally intrusive.

Figure 3:
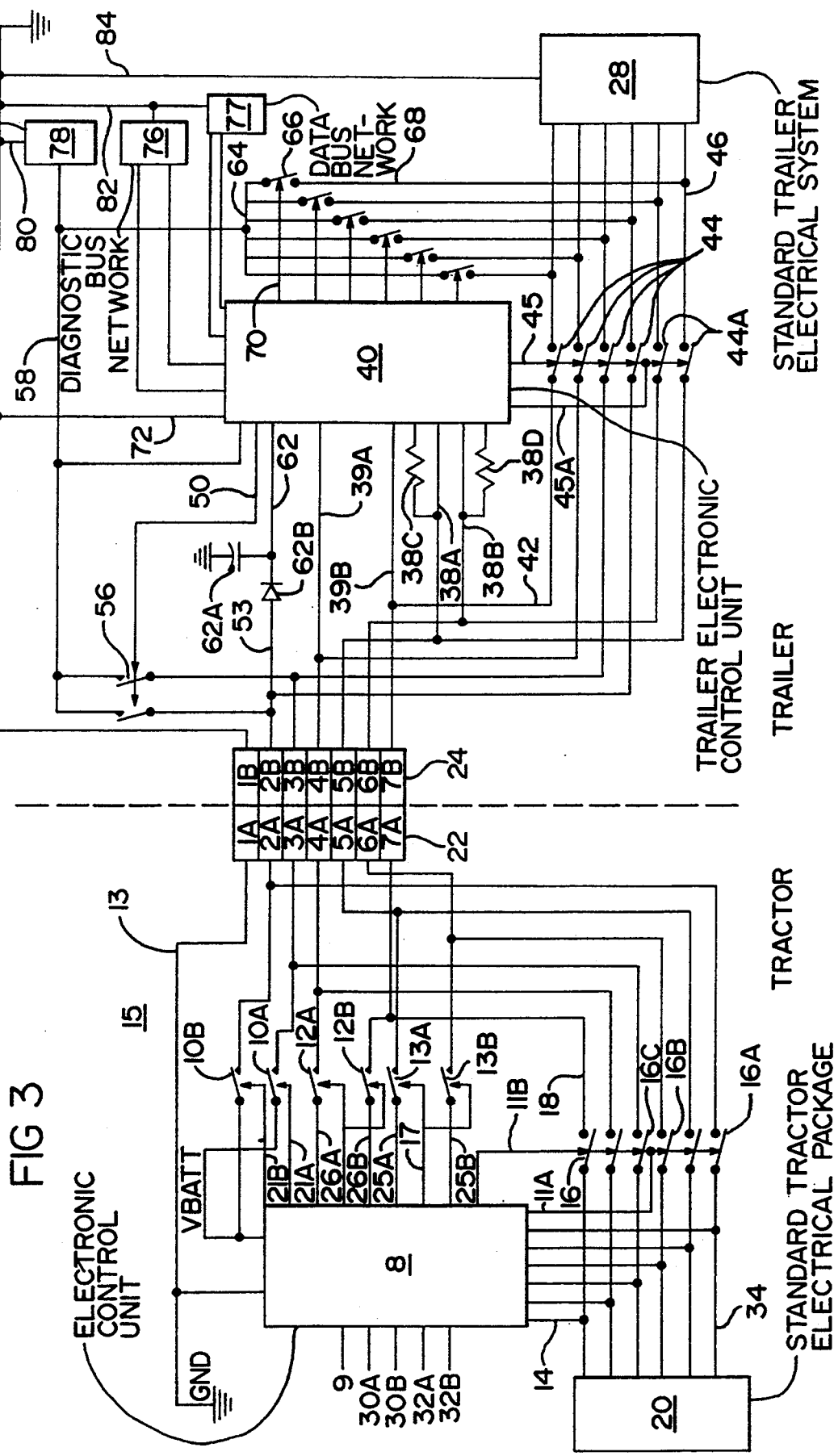
FIG. 3 is a schematic view of an embodiment of the present invention having one electronic control unit in a tractor joined to a trailer having another electronic control unit.

FIG. 3 illustrates a tractor having an advanced tractor electrical system 15 and a trailer having an advanced trailer electrical system 23 where the tractor contains a tractor electronic control unit 8 and the trailer likewise contains a trailer electronic control unit 40 for generating and receiving electronic signals and for controlling a plurality of switching devices 10A, 10B, 12A, 12B, 13A, 13B, 16, 16A, 16B, 16C, 44, 44A, 56, 66 to configure the tractor and trailer electrical systems to a new standardized operating mode.

The tractor electronic control unit 8 receives input signals from the standard tractor electrical package 20 through electrical taps on the normal tractor lines 34 as shown by the tractor electronic control unit normal signal lines 14. In this manner all normal input information from the tractor is available to the electronic control unit 8 so that the appropriate control signals can be outputted on the plurality of tractor electronic control unit output signal lines 25A and 25B when a trailer having the appropriate advanced electrical subsystems is connected to the tractor. As explained supra, if a standard trailer is connected to the tractor, then the electronic control unit 8 closes the tractor normal signal switches 16, 16A, 16B and 16C and holds open the electronic control unit signal switches 10A, 10B, 12A, 12B, 13A and 13B so that the tractor and trailer operate in the normal fashion without advanced systems.

To determine whether the trailer has an advanced trailer electrical system 23, the tractor electronic control unit 8 closes the electronic control unit switch 10B and opens switches 16A, 16B and 16C by energizing the tractor signal switch control lines 21B and 11A.

As illustrated in FIG. 5, control line 21B is energized on a low duty cycle pulse width modulation (PWM) basis from the battery voltage during the inquiry code operating mode. The duty cycle is not sufficient to cause a high time averaged current to flow to the trailer system 28 lights connected through socket 2A and pin 2B and switch 44 however, it is sufficient to charge capacitor 62A through diode 62B in the trailer electronic control unit 23 and to supply the necessary small current to operate the trailer electronic control unit 40. Any type of energy storage means could be used as an alternative to the diode 62B and capacitor 62A system.

When socket 2A and pin 2B needs to be energized with voltage full time, such as when the lights are on as sensed by the tractor control unit 8 through the tractor electronic control unit normal signal line 14, control line 21B then causes socket 2A to be energized full time.

When a predetermined time has elapsed, sufficient to charge capacitor 62A and operate the trailer electronic control unit 40, the tractor electronic control unit 8 closes switches 13A and 13B by energizing the tractor signal control line 17 and then outputs an inquiry code on the tractor electronic control unit output signal lines 25A and 25B that go to tractor connector sockets 5A and 6A which then travels to connector pins 5B and 6B and into the trailer electrical system. If the trailer system is a conventional trailer electrical system 19 there is no response to the inquiry data code from the trailer electrical system 19 and, as described supra, the tractor switches are configured to operate the trailer in a normal fashion.

If the trailer has an advanced trailer electrical system 23, the inquiry data code generated by the tractor electronic control unit 8 is connected to the trailer electronic control unit 40 through data lines 38A and 38B. The trailer electronic control unit 40 then energizes control line 45A to open switches 44A and then responds with a coded signal that is sent through high impedances 38C and 38D into the tractor electronic control unit 8 via the trailer connector pins 5B and 6B and tractor connector sockets 5A and 6A, whereupon the tractor electronic control unit 8 causes the tractor electrical system to be configured in an appropriate manner by causing the electronic control unit signal switches 12A and 12B to be closed and signal switches 13A and 13B to remain closed, and the power switch 10B to remain closed and the line 21A is energized to close power switch 10A and line 11 is energized to cause tractor normal signal switch 16 to open and switches 16A, 16B and 16C are caused to remain open. The tractor electronic control unit 8 communicates with the trailer electronic control unit through the tractor electronic control unit signal lines 25A and 25B which can contain a variety of signal information as determined by the software residing in the tractor electronic control unit 8. Also outputted from the tractor electronic control unit is a variety of diagnostic codes which are outputted on lines 30A and 30B to an onboard display system or to an external diagnostic system for monitoring and repair guidance. Also outputted from the electronic control unit 8 are data links 32A and 32B which can communicate to other electronic systems as needed.

Power switch 10A supplies battery voltage electrical power to the trailer system through tractor connector socket 3A then into trailer connector pin 3B which is then distributed to a plurality of switching devices in the second switching package 56. Nearly simultaneously to the actions of the tractor electronic control unit 8, trailer electronic control unit 40 energizes control line 50 to cause switches 56 to close and conduct power via the switch output lines 58 to the new electrical outputs 78 which supplies power to any onboard advanced trailer system such as anti-lock brakes, trailer anti-swing, etc.

Output line 58 also conducts power to the trailer electronic control unit 40 and a plurality of switching devices in the switching package 66 which, when any switching device 66 closes by signal from the trailer electronic control unit 40 through third switch control lines 70, causes power to be conducted to any selected standard trailer electrical system as represented by the standard trailer electrical package 28.

Also, to provide for a voltage potential, a grounding system is established from the tractor ground through ground line 71 into tractor connector socket 1A which is mated to trailer connector pin 1B and runs to various systems through ground lines 72, 80, 82 and 84.

The tractor electronic control unit signal lines 25A and 25B contain a variety of signals generated by the tractor electronic control unit 8 and are connected via tractor connector sockets 5A and 6A to trailer connector pins 5B and 6B. The signal from trailer connector pins 5B and 6B are conducted to the trailer electronic control unit 40 through signal lines 38A and 38B which can carry multiplexed information between the trailer electronic control unit 40 and the truck electronic control unit 8. Signal lines 38A and 38B are relatively low impedance lines. Subsequent to establishing a communications partnership from the inquiry code and the coded signal response, conducting communications between the electronic control units on low impedance lines adds to the overall reliability of the communications linkage.

The trailer electronic control unit 40 also controls a plurality of switching devices found in the standard distribution switches 44 and 44A which are held in an open state when the tractor electronic control unit 8 has established an inquiry response communication. Otherwise, they remain in a closed state. The trailer electronic control unit 40 upon connection of the tractor electrical connector 22 to the trailer electrical connector 24 receives battery voltage power from socket 2B and line 62 but until it receives an inquiry code via tractor connector sockets 5A and 6A and trailer connector pins 5B and 6B and thereby senses that the tractor does contain an advanced electrical system 15, the otherwise closed second plurality of switches 44 and 44A appropriately direct normal trailer functions to the standard trailer electrical package 28.

Again, when both the tractor and the trailer have advanced electrical systems, the trailer electronic control unit 40 will open switches 44 and 44A and energize appropriate elements of control line 70 whereupon the tractor 12 volt DC power will be conducted through the switch power line 64 into the switch output lines 68 and to the standard trailer electrical package 28 selectively according to the code signals received from the tractor electronic control unit 8 on lines 38A and 38B indicating the state of the standard tractor electrical package 20 as received through the tractor normal signal output lines 34. In this manner, the trailer auxiliary lights, tail and license lamp, turn signals, stop lights and side marker lights can be energized appropriately.

Additionally, the trailer electronic control unit 40 is connected to a diagnostic bus network 76 and a data bus network 77 which is also on the trailer. Other advanced systems on the trailer are also connected to the diagnostic bus network 76 and the data bus network 77. These advanced systems may be the aforementioned ABS system, trailer anti-swing, etc. or they may be elements of additional tractor-trailer electrical connection systems as herein disclosed which may be used for interconnecting trailer to trailers in doubles combination.

Trailer electronic control unit 40, through internal software algorithms, is capable of receiving the data and diagnostic signals and regenerating them and then outputting them on signal lines 38A, 38B, 39A and 39B for transmission to the tractor electronic control unit 8. Likewise, the tractor electronic control unit 8 may regenerate portions of the data signals it receives or transmits on lines 30A, 30B, 32A, 32B, 25A, 25B, or 26A or 26B. One of the uses for regenerating data would be to apply a marker to the information which would identify to which of several trailers in a combination the data belonged. Regeneration also allows for additions to the information stream which are required for intercommunication between tractor electronic control unit 8 and the trailer electronic control unit 40. For example, with the initial inquiry the tractor electronic control unit 8 determines how many trailers are attached. To address a particular trailer, the tractor electronic control unit assigns a marker code to one or more bits in the data stream, for example, a 3 could be used to address the third trailer. That marker code value is then decremented by one as it passes through each trailer electronic control unit 40 and the signal is acted upon when the value of the marker code is equal to 1 at the third trailer.

In a similar fashion, the trailer electronic control unit 40 can send data to the tractor electronic control unit 8 by setting the marker code to a value of 1 and subsequent trailer electronic control units 40 then increment the value of the marker code by one so that its value is 3 when it reaches the tractor electronic control unit of the third trailer. In this manner, by using a marker code and regenerating the data signal to increment or decrement the marker code at each trailer electronic control unit 40, the tractor electronic control unit 8 can send and receive data signals to and from a particular trailer.

Referring to FIG. 4, a trailer having an advanced trailer electrical system 23 is electrically joined through standard connectors 22 and 24 to a standard tractor having a standard tractor electrical package 20. In this case, the trailer electronic control unit 40 may receive power from line 62 but since it does not receive an inquiry code on lines 38A and 38B, none of the switches are energized. In this manner the advanced trailer electrical package 23 is electrically configured to respond in an identical fashion to a standard trailer electrical package such that the standard tractor electrical package 20 is connected to the standard trailer electrical package 28 via the tractor output lines 18, tractor electrical connector 22, the trailer electrical connector 24, the standard distribution lines 42 and the standard distribution switch line outputs 46.

Figure 6:
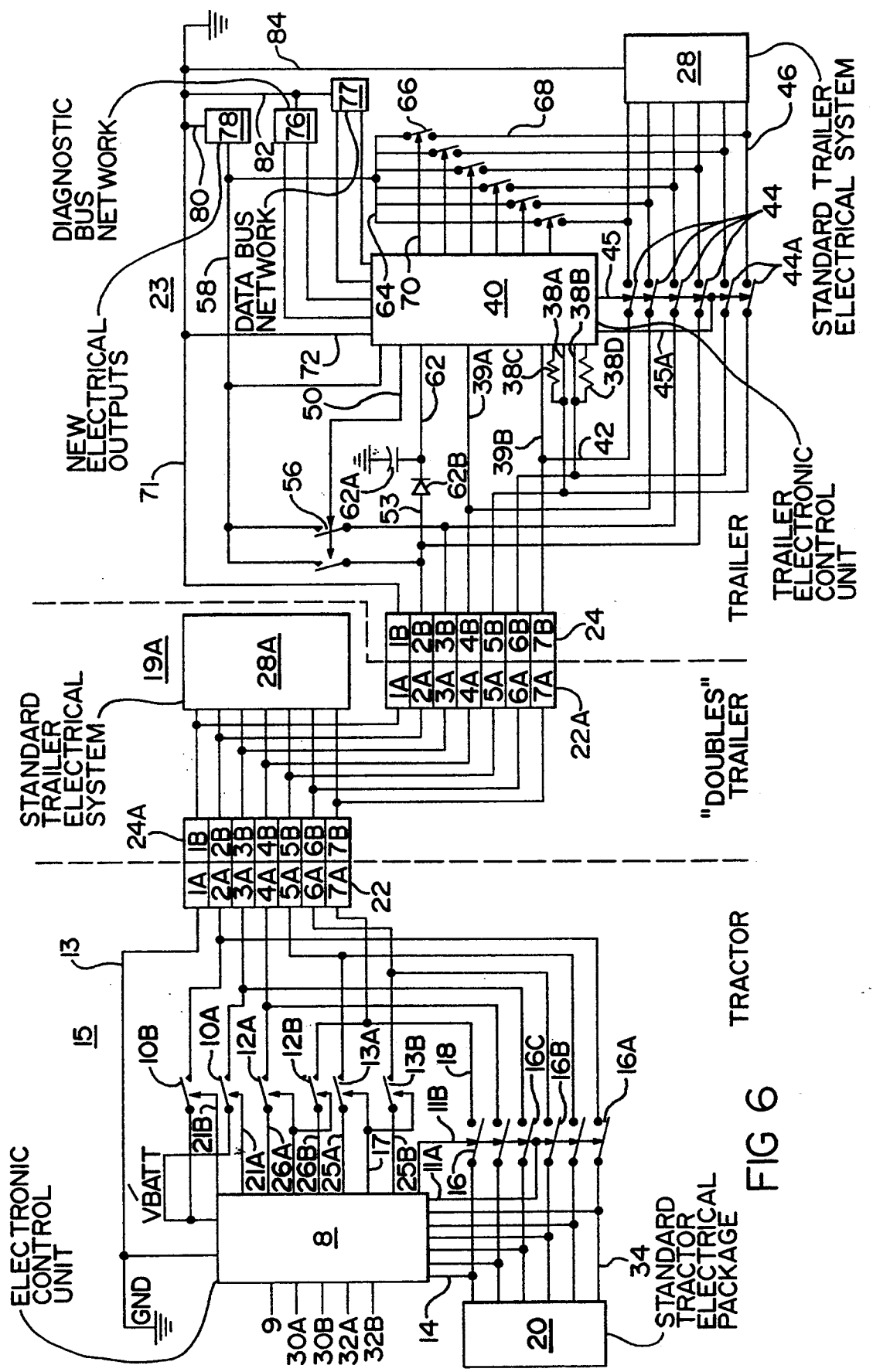
FIG. 6 is a schematic view of the present invention utilized in a tractor-doubles trailer-trailer configuration.

Referring to FIG. 6, the electrical interconnection of a double trailer vehicle combination arrangement, as are common in vehicle configurations, is shown. For this figure, it consists of a tractor having an advanced trailer electrical system 15 that is electrically joined to a conventional "doubles" trailer that is electrically joined to a trailer equipped with an advanced electrical system 23. The arrangement reveals that the present invention will operate trailers as non-equipped vehicles when at least one intervening conventional trailer is interconnected.

The conventional "doubles" trailer has a standard "doubles" electrical system, which are well known, and consists of a standard trailer electrical system 28A plus a portion of a standard connector package 22A which is mounted at the rear and is connected in alignment, pin for socket, with the standard connector package 22 and 24A to allow for the electrical connection of additional trailers that are towed.

As explained supra, when the tractor electronic control unit 8 performs the system inquiry mode check, a voltage is applied and after a predetermined time an inquiry code signal is applied to connections 5A and 5B and to 6A and 6B of a standard connector package 22 and 24A and switches 16A, 16B and 16C are held open to disconnect portions of the standard tractor electrical system 20. The inquiry code signals are conducted to the standard trailer electrical system 28A of the conventional "doubles" trailer and to the second standard connector package 22A and 24 and to the standard trailer electrical system 28 and to the trailer electronic control unit 40 of the advanced electrical system 23 of the second trailer in the combination vehicle. Although some of the signal current goes to the two standard trailer electrical systems 28A and 28, the electrical power source of the tractor advanced electrical system 15 is of a relatively low impedance such that the voltage of the inquiry code signal applied to lines 38A and 38B of the trailer advanced electrical system 23 is not substantially reduced.

Again, as explained supra, when the electronic control unit 40 receives appropriately coded signals on lines 38A and 38B, it responds by opening switches 44A and sending a coded signal through relatively high impedances 38C and 38D to standard trailer connector package 22A and 24. The signal is conducted through the intermediate trailer to the standard connector package 24A and 22 to tractor electronic control unit 8. Some of the signal current goes to the electrically attached standard trailer electrical system 28A of the intermediate conventional "doubles" trailer of the vehicle combination. This signal current to the standard electrical system 28A and the relatively high impedances 38C and 38D in each of the lines from the electronic control unit 40 cause a relatively low voltage of the signal at the tractor electronic control unit 8 that will be interpreted as an unacceptable response and therefore the system switches will be configured by the software to operate the two trailers as conventionally equipped vehicles. This feature of the system assures that the conventional trailer functions will be serviced when a non-equipped trailer is connected between a tractor and trailer which are equipped with advanced electrical systems. If one of the trailers does not have the communication system of the present invention, all subsequent trailers will also act as a standard trailer.

The description of the preferred embodiment of the present invention is by way of example only. Various modifications and rearrangement of components are contemplated without departing from the spirit in the scope of the invention as hereinafter claimed.

What is claimed is:

1. A tractor and trailer electrical communication system comprising:
   a tractor electronic control unit for generating and receiving electrical signals connected to a tractor electrical system, said tractor electronic control unit having a plurality of signal output lines and at least one power output line;
   a first plurality of switching devices for connecting and disconnecting said signal output lines and said power output lines to and from a first electrical connector, said first plurality of switching devices controlled by said tractor electronic control unit;
   a second plurality of switching devices for connecting and disconnecting said tractor electrical system to and from said first electrical connector; said second plurality of switching devices controlled by said tractor electronic control unit;
   where electrical power from said power output line is selectively routed to said first electrical connector being joined to a second electrical connector at a trailer and where said tractor electronic control unit generates and outputs an inquiry code on one of said signal output lines and then closes or opens each of said first plurality of switching devices and each of said second plurality of switching devices according to receiving or not receiving one or more predetermined responses thereto from said trailer.

2. The tractor and trailer electrical communication system of claim 1, wherein said second electrical connector from said trailer is connected to at least two output switches and a trailer electronic control unit for generating and receiving electrical signals, said output switches being connected to a trailer electronic system, the state of each of said output switches being controlled by said trailer electronic control unit, said trailer electronic control unit also controlling the state of each of a third plurality of switching devices connecting said second electrical connector to a trailer electrical system and said trailer electronic control unit also controlling the state of each of a fourth plurality of switching devices connecting said trailer electronic control unit to said trailer electrical system; where said tractor electronic control unit transmits and receives a multiplexed signal from said trailer electronic control unit over said signal output lines.

3. The tractor and trailer electrical communication system of claim 2, further comprising a diagnostic bus network connected to and controlled by said trailer electronic control unit.

4. The tractor and trailer electrical communication system of claim 2, further comprising a data bus network carrying a data stream connected to and controlled by said trailer electronic control unit where said data stream includes a marker code where said marker code is regenerated by each of said trailer electronic control units by incrementing or decrementing said marker code for identification of said trailer by said tractor electronic control unit.

5. The tractor and trailer electrical communication system of claim 1, wherein a trailer electrical system comprises a trailer electronic control unit for generating and receiving electrical signals and a plurality of switching devices controlled by said trailer electronic control unit to configure said trailer electrical system for a multiplex data link between said tractor electronic control unit and said trailer electronic control unit.

6. The tractor and trailer electrical communication system of claim 1, wherein said first electrical connector and a second electrical connector electrically linked to the trailer and to said first electrical connector has seven connections between said first and second electrical connectors.

7. The tractor and trailer electrical communication system of claim 1, wherein said tractor electronic control unit generates a high speed data signal which is transmitted to said trailer on said signal output line.

8. The tractor and trailer electrical communication system of claim 1, wherein said tractor electronic control unit receives a high speed data signal from said trailer on said signal output lines.

9. The tractor and trailer electrical communication system of claim 1, wherein said tractor electronic control unit generates a signal on said signal output lines according to an electrical state of said tractor electrical system.

10. A tractor and trailer electrical communication system comprising:
   first switching means for selectively connecting and disconnecting a plurality of tractor control unit electrical output lines and disconnecting and connecting a tractor electrical system to a first electrical connector;
   second switching means for selectively connecting and disconnecting a plurality of trailer control unit electrical output lines and connecting and disconnecting a trailer electrical system to a second electrical connector where said second electrical connector is electrically joined to said first electrical connector;
   third switching means for selectively connecting and disconnecting a power source to said first electrical connector;
   a tractor electronic control unit connected to said tractor electrical system and connected to said tractor control unit electrical output lines and connected to and controlling the state of said first switching means and said third switching means;
   a trailer electronic control unit connected to said second electrical connector and connected to and controlling the state of said second switching means and connected to and controlling the state of said third switching means.

11. The tractor and trailer electrical communication system of claim 10, wherein at least two of said plurality of tractor control unit electrical lines are used for information transfer between the tractor and at least one trailer.

12. A method of providing a tractor and trailer electrical communication system comprising:
   providing a first switching means located in a tractor;
   providing a second switching means located in said tractor;
   providing a tractor electronic control unit for generating and receiving electrical signals electrically connected to and controlling the state of said first and second switching means and connected to a tractor electrical system, said first switching means electrically connected between a plurality of signal output lines and a first connector, said second switching means electrically connected between said tractor electrical system and said first connector;
   providing a trailer electronic control unit for generating and receiving electrical signals, said trailer electronic control unit being electrically connected to a second connector;
   providing a third switching means having a state controlled by said trailer electronic control unit connected between a second connector and a trailer electrical system, said second connector being electrically joined to said first connector;
   providing a fourth switching means connected between said electronic control unit and said trailer electrical system;
   generating an inquiry code from said tractor electronic control unit and sending said code to said trailer electronic control unit over one of said signal output lines and if a predetermined response thereto is sent to said tractor electronic control unit from said trailer electronic control unit; then
   closing said first switching means;
   opening said second switching means;
   opening said third switching means; and
   closing said fourth switching means.

13. The method of providing the tractor trailer electrical communication system of claim 12, further comprising:
   providing a fifth switching means having a state controlled by said trailer electronic control unit connected between said second connector and an electrical output connector connected to a trailer system;
   closing said fifth switching means upon command from said trailer electronic control unit.

14. The method of providing the tractor trailer electrical communication system of claim 12, further comprising a diagnostic bus network connected to and controlled by said trailer electronic control unit.

15. The method of providing the tractor trailer communication system of claim 12, further comprising a data bus network connected to and controlled by said trailer electronic control unit.

16. A method of providing a tractor and trailer electrical communication system comprising:
   providing a first switching means located in a tractor;
   providing a second switching means located in said tractor;
   providing a tractor electronic control unit for generating and receiving electrical signals electrically connected to and controlling the state of said first and second switching means and connected to a tractor electrical system, said first switching means electrically connected between a plurality of signal output lines and a first connector, said second switching means electrically connected between said tractor electrical system and said first connector;

providing a trailer electronic control unit for generating and receiving electrical signals electrically connected to a second connector;
providing a third switching means having a state controlled by said trailer electronic control unit connected between a second connector and a trailer electrical system, said second connector being joined to said first connector;
providing a fourth switching means connected between said electronic control unit and said trailer electrical system;

generating an inquiry code from said tractor electronic control unit and sending said code to said trailer electronic control unit over one of said signal output lines and if no response thereto is sent to said tractor electronic control unit from said trailer electronic control unit; then
opening said first switching means;
closing said second switching means;
closing said third switching means; and
opening said fourth switching means.

* * * * *